(No Model.)

L. R. WITHERELL.
PORTABLE SCALE FOR WEIGHING VEHICLES.

No. 303,905. Patented Aug. 19, 1884.

Witnesses.

Inventor.
Loren R. Witherell

UNITED STATES PATENT OFFICE.

LOREN R. WITHERELL, OF DAVENPORT, IOWA.

PORTABLE SCALE FOR WEIGHING VEHICLES.

SPECIFICATION forming part of Letters Patent No. 303,905, dated August 19, 1884.

Application filed February 12, 1884. (No model.)

*To all whom it may concern:*

Be it known that I, LOREN R. WITHERELL, a citizen of the United States, residing at Davenport, in the county of Scott and State of Iowa, have invented certain new and useful Improvements in Weighing-Scales; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The purpose of my invention is to provide a portable scale, whereby loaded vehicles or bulky objects may be correctly weighed on the road or in the field, wherever they may happen to be, without the trouble and cost of driving the vehicle or lifting the object to be weighed upon the platform or other scales now in use. The scale I have invented accomplishes this by weighing one wheel, or one side or end of the object at a time, and adding together the weights so found, the sum of these weights giving the full weight of the whole load or object.

The invention consists in the mechanism and combinations hereinafter described and claimed.

Figure 1:
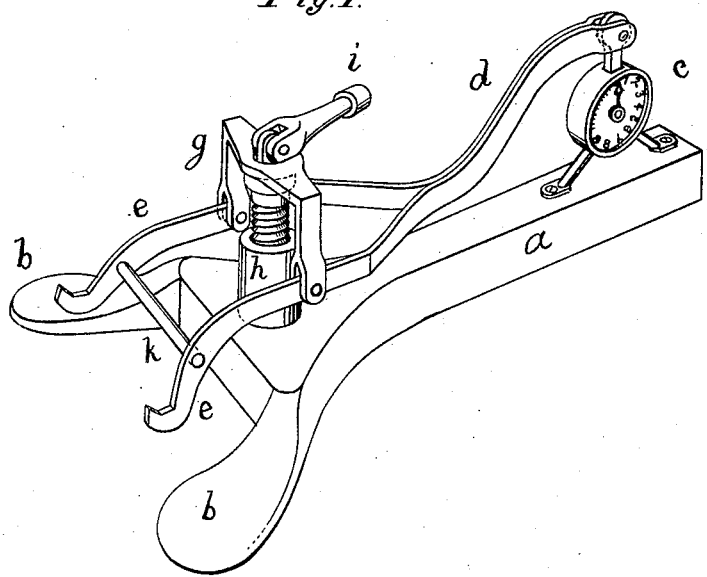
Figure 2:
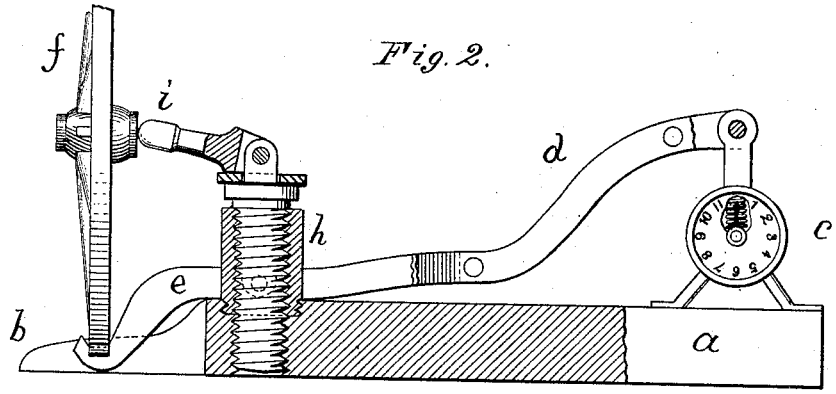

Figure 1 is a perspective view. Fig. 2 is a longitudinal section.

A substantial body, $a$, is constructed of iron or timber, upon which the weighing apparatus is supported. It may be provided with casters or low wheels, if desired, to facilitate movement toward the object to be weighed. The forward part of this body is provided with two flat projecting feet, $b\ b$, so spread apart that, when pushed up to the wagon or load, they will rest upon the ground on either side of the point of bearing of the wheel of the wagon to be weighed. A spring-balance with dial-plate $c$ is affixed to the rear end of this body or foundation, and attached thereto is the end of the weighing lever or beam $d$. This weighing lever or beam is double, the forward ends being spread apart, so as to form two arms, $e\ e$. These arms are curved downward, dropping to the level of and between the flat feet $b\ b$, and terminate in hooked points, by means of which the wheel of the wagon may be caught by its rim $f$ on either side of the point of rest, and held firmly while being raised from the ground. The arms of the beam are pivoted upon the ends of a yoke, $g$, suspended upon the top of a jack-screw, $h$, the socket of which is firmly fixed in the forward part of the body. The arms of the beam are held apart in proper position by the brace-rod $k$. The screw is provided with an operating-lever, $i$, whereby it may be turned, and the beam, with the load resting upon the points of the arms, raised from the ground. When so raised the weight will be indicated upon the dial-plate. When the weight of one side of the load is noted the machine can be withdrawn and taken to the other side of the load and that side raised and weighed in the same manner. The sum of the weights shown on the dial will give the gross weight of the vehicle and its load. The same process is to be used in weighing heavy pieces of metal or machinery, or objects too bulky to be lifted bodily upon scales in ordinary use. The arms of the beam being placed under one end of the object and the weight taken, the other end may be afterward raised and weighed in like manner, and the weights indicated added together.

Instead of the spring-balance and beam, as shown, a graduated lever or steelyard with the usual weights may be used.

I claim as of my invention and desire to secure by Letters Patent—

1. The lever or beam having two arms, $e\ e$, pivoted upon the yoke $g$, in combination with the spring-balance and jack-screw affixed to the body $a$, substantially as described, and for the purposes indicated.

2. The combination of the yoke $g$ and lifting-jack $h$, with the beam and balance, substantially as described and shown.

3. In a weighing-scale, the body $a$, provided with projecting flat feet $b\ b$ and lifting-jack $h$, in combination with the beam and yoke, and scale, substantially as described and shown, and for the purposes specified.

In testimony whereof I affix my signature in presence of two witnesses.

LOREN R. WITHERELL.

Witnesses:
S. P. BRYANT,
J. H. MERRITT.